INVENTOR
MELVIN J. KOFOID
BY
ATTORNEY

Patented Jan. 22, 1952

2,583,380

UNITED STATES PATENT OFFICE 2,583,380

ELECTRIC CIRCUIT TO PRODUCE SURGE DISCHARGES AT A HIGH RATE

Melvin J. Kofoid, Corvallis, Oreg., assignor to Northwest Nut Growers, Dundee, Oreg., a cooperative association of Oregon Application January 3, 1950, Serial No. 136,435

4 Claims. (Cl. 320—1)

The invention hereinafter disclosed is an electric surge circuit for electric nut cracking by reason of its ability to produce surges of high amperage and voltage, with many times the rapidity heretofore attainable, and with comparatively low current consumption from a low voltage supply.

The above may be considered as a statement of the major object of the invention, which is accomplished by the combined use of storage and discharge capacitors, with the former and the current supply apparatus so protected by electrical devices that the entire stored charge is not sent across discharge electrodes, but only that energy of the discharge capacitor, while the current supply apparatus and the storage capacitor are operated at their rated capacity to furnish the necessary stored energy for a practically instantaneous recharge of the discharge capacitor.

A further object is provision for plural capacitors in the same circuit, with a current smoothing and limiting device comprising resistors and reactors that prevent otherwise damaging and to be expected surges between the capacitors.

Another, mechanical, object is a high speed interrupter placed in one conductor of the surge discharge circuit and a distributor in the same conductor, timed by their pre-selected ratio of concurrent closing of the circuit, which last named combination is absolutely essential where a plurality of cracking machines are to be energized from the same electrical circuit, for the double purpose of making the installation successful within a practicable capital cost and further to break the discharge in not more than fifty millionths of a second to prevent a flaming arc from establishing itself across the discharge electrodes.

Other objects will be clearly apparent from the disclosures infra, from the explanations of their mode and objectives. The objectives are accomplished by the structures and combinations of structures, of electrical and mechanical devices recited in the claims.

Drawings accompany and form a part of this disclosure, in which:

Fig. 1, the basic circuit, forms a part of the disclosure in the joint application of Mulvaney et al., Serial No. 98,372, for Nut Cracking Machine, filed June 13, 1949, which describes a full sized, fully tested machine of commercial size and capability, which is the machine, or its equal, that is meant hereinafter when a nut cracking machine is mentioned for purposes of clarity in this disclosure.

Figure 1:
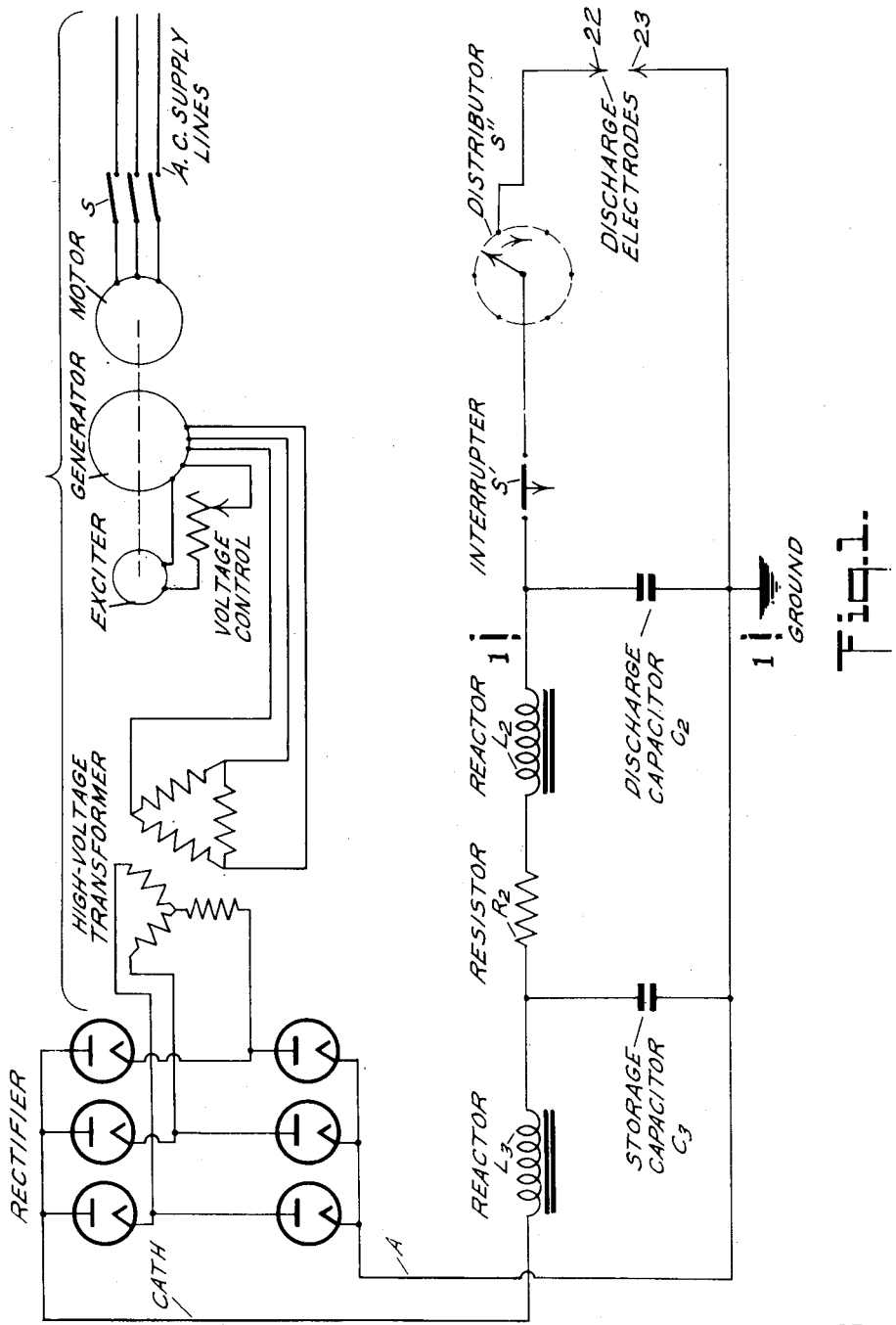

In Figs. 2 to 5 inclusive, only that part of the basic circuit, Fig. 1, has been shown, i. e. to the right of the line 1—1, as the rest remains unchanged.

Explaining the drawings in greater detail. First, this description is to be regarded as singular to this circuit. The circuit includes a source of current supply, symbolized by the three lines marked "A. C. supply line," otherwise, a commercial three phase connection. The conventional symbol of a switch S, indicates a control board for the motor generator set comprising the devices embraced by the bracket in Fig. 1. Of course the motor generator set is to mechanically isolate the high voltage surge circuit from the commercial lines, which is a must for many reasons.

Next in line, all of which is old, is a three phase full wave transformer, identified by the legend, and then next in order is a six tube kenotron tube rectifier of such capacity that it will have a normal load of as nearly to 100 per cent of its rated capacity as may be arranged for by the other components of the circuit. While it is not of importance which of the lines leading from the rectifier is anode or cathode, I prefer that they shall be as marked, A for anode and cath for cathode.

The nuts are cracked, or perhaps more properly, exploded, by causing an electric surge current of high voltage and amperage to pass through the shell, between the stem and blossom ends of the nut (in the case of walnuts), which shatters the shell, leaving the meat halves very largely undamaged as to original shape and wholly undamaged by reason of the process.

In order to establish an electric breakdown through the shell of the nut, the current must be supplied from a high voltage source. In practice, a power supply producing voltage with a minimum of seventy kv. and capable of delivering a surge current of the order of five thousand amperes crest is required. To crack a walnut a voltage of at least 45 kv. is required and 70 kv. is preferred. Higher voltages can be used but the equipment becomes burdensomely expensive without corresponding advantage. Surge generators which can produce such discharges at a rate of one per second, or one every few seconds, are well known in the electrical art. However, the practical electric nut cracker must be capable of supplying a great many high-current high-voltage surge discharges of the minimum characteristic described, every second, as a continuous operation.

With the known circuits used up to the present time and described in electrical engineering literature, to produce the surge currents at a slow rate, it is impossible or at least commercially impractical to produce the rapid fire continuous surges as indicated supra.

The electric power control circuit described in this specification is designed to produce sixty surge discharges per second, does it easily, and can be changed to produce a considerably larger number of discharges by simply changing the values of several of the circuit constants, as will be apparent to the electrical engineer, from the principles explained in describing the present structure.

Further objects of the present invention are to fully meet the conditions as outlined, which, it is believed, are not obvious, and has never been done before.

It is a further object to so arrange the electrical devices and auxiliary parts that a moderate sized electrical generating system can operate as analogic of a small hydraulic pump and accumulator, wherein a relatively small capacity of the pump is compensated for by steady operation with storing the energy it creates in the accumulator.

The output of high voltage current (direct current after leaving the bank of rectifier tubes identified by the legend "rectifier," being the well known kenotron tubes, which deliver the output current through the cables, a cathode and the anode identified by legends), through the devices named on the drawing, Fig. 1, as the reactor $L_3$, storage capacitor $C_3$, resistor $R_2$, reactor $L_2$, discharge capacitor $C_2$, and the control switches, an "interrupter" S', which revolves at high speed, a "distributor" S'', also revolving in timed relationship with the interrupter S', and both of which will, in the case of an electric nut cracking machine, be timed with machinery which accurately and timely places nuts to be cracked between the electrodes 22 and 23 as described in the application named.

The circuit, comprising the devices named and placed in the mutual relationship shown, will take commercial current from a local power company's 60-cycle, 440-volt, 3-phase commercial line and with a moderate draft of energy therefrom, convert the energy at a steady rate into 5,000 amperes 70,000 volt surge discharges of very short duration with a repetition rate of sixty surges per second or more.

The following is the mode of operation to achieve the result just stated, from which it will be clearly apparent that it is the electrical principles of the circuit that make possible the production of high-voltage, high-current electric surges at such a very high rate of repetition from an ordinary low voltage power source of such moderate current capacity, that one's first impression is that there is a claim to the absurdity of an exception to the doctrine of the conservation of energy, which is accounted for by the extremely short duration of the high-potential high-current discharges, measurable only by millionths of a second, made possible as will be seen.

None of the foregoing and following instruments can possibly operate with success, minus the presence of the interrupter S', which will have a peripheral velocity not less than 4,000 feet per minute, if made so that it closes the gap within which it is set twice every revolution. It is to be taken into consideration that the duration of the discharge of discharge capacitor $C_2$ cannot be allowed to persist more than fifty millionths of a second; hence if the diameter of the electrode S, is of the order of say one-fourth of an inch and the peripheral speed is of the order of 4,000 f. p. m., the requisite circuit interrupting rapidity is attained, as it should be attained, just as the charge of capacitor $C_2$, has virtually ceased and before the protection of reactor $L_2$ and resistor $R_2$ has permitted a surge to go over from the storage capacitor $L_3$.

With all devices in place and properly proportioned for the circuit, the following is the mode and result.

Referring to Fig. 1.

1. Let the discharge capacitor $C_2$ be charged to the desired full voltage by being connected to the high-voltage D.-C. power supply as shown.

2. When interrupter switch S' and distributor switch S'' are closed simultaneously, the voltage which appears between points 22 and 23 is sufficient to cause electric breakdown between electrodes 22 and 23 and hence through the nut.

3. As soon as breakdown between electrodes 22 and 23 is established, a surge of current flows in the circuit consisting of discharge capacitor $C_2$, interrupter S', distributor S'' and discharge electrodes 22 and 23.

4. The surge of current lasts until the capacitor $C_2$ is essentially discharged.

5. The shape of the surge current wave is determined by the magnitude of the capacitance of $C_2$ and by the total resistance and inductance of the discharge circuit.

6. The magnitude of the current is determined by these circuit constants and by the voltage to which capacitor $C_2$ is charged, just prior to breakdown.

7. Interrupter switch S' is quickly opened after capacitor $C_2$ is discharged; this permits the recharging of capacitor $C_2$ to start immediately after the surge discharge occurs.

8. The capacitor $C_2$ is charged to full voltage again, i. e. to the exact condition of step "1," by virtue of being connected to the storage capacitor $C_3$ and the high-voltage D.-C. power supply as shown.

9. The high-voltage D.-C. power supply charges the discharge capacitor $C_2$ from a completely discharged condition to a condition of the capacitor having full voltage between its terminals in a period of time of $1/N$ second, or less, if the discharge capacitor $C_2$ is being discharged at a rate of $N$ discharges per second.

10. The distributor switch S'' has a multiplicity of points, each connected to the high-voltage electrode 22 of a separate feeding and cracking mechanism. Thus, the electric surges produced by the discharge of capacitor $C_2$ are distributed to the different feeding and cracking mechanisms in a repeated regular prescribed order.

11. The discharge capacitor is charged from a conventional type three-phase full-wave high-voltage rectifier through a special smoothing-filter and current limiting network.

12. The rectifier comprises a motor-generator set supplying low A.-C. voltage which is transformed to high A.-C. voltage through a transformer and applied to kenotron rectifier tubes. The rectifier tubes effect the necessary electric valve action to provide unidirectional current flow.

13. The high-voltage electric supply is designed to produce a large number of surge discharges per second.

14. To charge capacitor $C_2$ in a period of time of 1/N second, or less (refer to part "9"), the necessary maximum value of current flowing into the discharge capacitor must be of a magnitude greatly in excess of the maximum current handling capacity of the kenotron-type high-voltage rectifier tubes now available. (The necessary high maximum value of current flow into the capacitor occurs because of the inherent exponential nature of the current flow found generally in charging capacitors.)

15. The current drawn through the rectifier tubes is kept within suitable limits by causing current to flow continuously through a smoothing reactor $L_3$ into a storage capacitor $C_3$.

16. The discharge current in the circuit constructed has a maximum value of the order of 5000 amperes and has a duration of the order of but 50 millionths of a second.

17. Present day high-voltage rectifier tubes will pass momentary maximum currents of only about 1.0 ampere and an average current of about 0.62 for one-third of the time. These ratings are appropriate for tubes in the highest voltage rating class—which are necessary in the electric nut cracking applications.

18. In the new circuit, the electric energy stored up in storage capacitor $C_3$ is available to charge the discharge capacitor $C_2$ by passing current to the discharge capacitor through resistor $R_2$ and reactor $L_2$—without any necessary limits on the maximum value of current flowing into the discharge capacitor.

19. A primary function of reactor $L_2$, acting with resistor $R_2$ is to cause the current flowing between the high-voltage terminal of storage capacitor $C_3$ and the high-voltage terminal of discharge capacitor $C_2$, to have a preferred wave form and magnitude.

20. An equally primary function of reactor $L_2$ is to severely limit the current, i. e. to essentially prevent the flow of any current, through the discharge circuit from the storage capacitor $C_3$ during a short period of time during and immediately following the discharging of capacitor $C_2$, and giving the interrupter $S'$ sufficient time to open the circuit.

21. It is essential that the current flowing through the electric gaseous discharges between the separating electrical electrodes of interrupter switch $S'$ be limited to a very small value immediately after capacitor $C_2$ has been discharged. Otherwise, interrupter switch $S'$ cannot be successful in its function of electrically disconnecting the high-voltage power supply capacitor $C_3$ from the discharge circuit and establishing a high level of voltage insulation in the interrupter switch. This is accomplished by the choking action of the iron-core reactor $L_2$, which performs its inherent function as a choke coil for a sufficient but very short time interval.

22. A high level of air-gap voltage insulation must be established in interrupter switch $S'$ very quickly. Otherwise, the rapidly increasing voltage across discharge capacitor $C_2$ will cause reignition of the arcs in the air gaps of the interrupter switch, i. e. re-establishment of conduction of current through the switch. The result would be (a) capacitor $C_2$ would be discharged before it was charged to the desired high voltage; and (b) capacitor $C_2$ would be discharged at the wrong time. The minimum peripheral velocity at which the moving electrode of interrupter switch $S'$ can be operated, when the voltage of $C_2$ is 70 kv., is about 4000 ft. per minute. This is when the switch forms two gaps in series in interrupting the arc.

No high-voltage circuit of the type indicated would operate without a high-speed interrupter switch to disconnect capacitor $C_2$ from the discharge circuit very quickly.

Without a distributor (which is also essential in assisting the interrupter to timely close the circuit), only one nut cracking machine could be operated with many thousands of dollars worth of high voltage electrical equipment, and such machines are limited by gravity forces placing the walnuts and other physical limitations to say 120 to 150 walnuts per minute, and the machine would be economically a failure. The symbolic distributor shows provision for six machines, but the number may be enlarged, as stated, by the capacity to deliver surges.

23. A second primary function of the high-speed interrupter switch $S'$ is to produce high precision in the time of "firing" by virtue of the high velocity of motion of its moving electrode. This is all-important and not incidental.

24. A primary function of the resistor $R_2$ is to make the circuit loop consisting of capacitor $C_3$, reactor $L_2$, resistor $R_2$, and capacitor $C_2$ non-oscillatory. If this circuit were permitted to be oscillatory, the maximum voltage stress on capacitor $C_2$ and $C_3$ might be increased and also the heating in both capacitors $C_2$ and $C_3$ would be increased considerably and tube ratings would be exceeded.

25. A second primary function of resistor $R_2$ is to dissipate energy. This resistor dissipates essentially all of the energy which would necessarily be dissipated in the ohmic resistance of capacitor $C_2$, reactor $L_2$, and capacitor $C_3$ in charging $C_2$, if resistor $R_2$ were not present. (It is assumed that the time required to charge capacitor $C_2$ is sufficient for any oscillations to die down in the circuit consisting of $C_2$, $L_2$, $R_2$, and $C_3$. This is very closely the practical case.) The energy which must be dissipated in ohmic resistance as heat in this circuit loop is precisely equal to the energy transferred into capacitor $C_2$ from the high-voltage power supply—no more, no less. In the circuit constructed, this energy is of the order of 20,000 watts. If resistor $R_2$ were not present, the ohmic resistance in which the heat would be dissipated would be, for most part, in reactor $L_2$, making it at least extremely difficult to construct this reactor and probably economically out of the question.

The preferred value of effective A.-C. inductance of reactor $L_3$ is 60 henries, while the A.-C. inductance value of reactor $L_2$ is 40 henries and the value of the resistance $R_2$ is 30,000 ohms, which value was not chosen in the sense of making it a current limiting function, which is the duty of reactor $L_2$, and all of the component parts of this filter net-work, $C_3$, $L_2$, $R_2$, and $C_2$, which have the proper value, in a circuit of this capacity, to so damp the circuit loop and prevent oscillation. If the circuit were permitted to oscillate, the current demand from the rectifier tubes would immediately exceed their ratings, probably sufficiently to wreck them.

Figure 2:
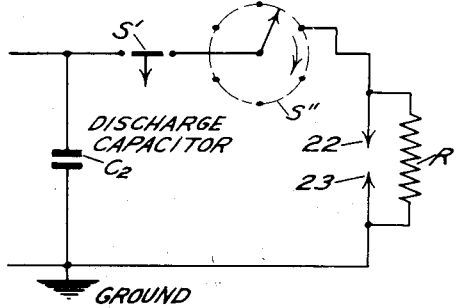
Fig. 2 is the identical circuit delineated in Fig. 1, with the addition of an additional element, i. e. a resistor of the order of one hundred thousand ohms placed directly across the nut cracking electrodes, 22 and 23, forming a part of a nut cracking machine.

Explaining the purpose of the structure of Fig. 2. In Fig. 2, conceivably a small leakage or corona current could pass through switches $S'$ and $S''$ and cause electrode 22 to rise in potential. If electrode 22 rises in potential sufficiently, corona current will pass across the electrodes passing through any nut positioned between the electrodes. If sufficient corona current passes through the nut for even a large fraction of a second, the nut meat will acquire a permanent burned taste. Placing a resistor of suitable low value across electrodes 22 and 23 prevents appreciable voltage from appearing between the electrodes when only a small corona current or leakage current is flowing. Essentially all of any current flowing will be conducted through the resistor and not through the nut.

Figure 3:
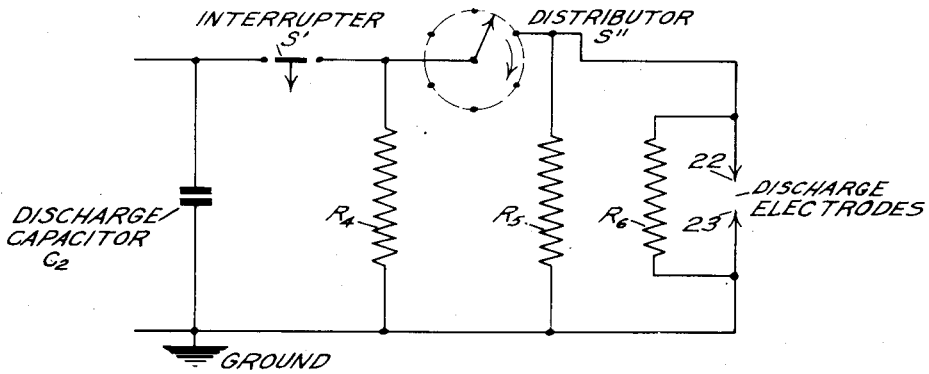
Fig. 3 is the discharge end of a circuit, otherwise similar to that part of Fig. 1 at the left of the line (vertical) 1—1, in Fig. 1, and the part to the right in Fig. 1 is shown to have resistors, $R_4$, $R_5$, and $R_6$, each having a value of about $10^6$ megohms, connected as shown.

Explaining the purpose of the variations in structure shown in Fig. 3. All of the resistors in Fig. 3 serve to enable the switching devices to operate consistently with a lower total voltage applied from capacitor $C_2$ than would otherwise be necessitated. (We see that the resistor across electrodes 22 and 23 serves a dual purpose.)

Without the resistors present, the voltage from capacitor $C_2$ must be sufficient to break down the air gaps of interrupter $S'$, distributor $S''$ and discharge gap 22—23, essentially all placed in series. Very high voltage is required to cause this combination of gaps to break down regularly. With the resistors present, the load side of each gap is definitely held at ground potential until an appreciable amount of current passes through the gap. But appreciable current cannot pass through the gap without the gas space being made conducting, i. e. a spark must pass. Thereafter, only a small voltage exists across the broken down and conducting gap and nearly all the voltage of capacitor $C_2$ is available to produce breakdown of the next gap. Hence, a considerably lower voltage of capacitor $C_2$ can be used satisfactorily. This lessens the cost of the switching devices equipment because it lessens the insulation requirements.

Figure 4:
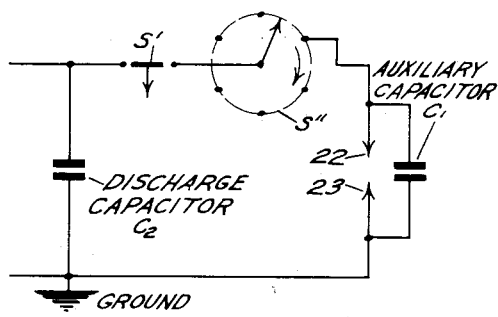
Fig. 4 is a different variation of the basic circuit of Fig. 1, in that the auxiliary capacitor $C_1$ is connected across the discharge electrodes 22 and 23, which will be explained, infra.

Fig. 4 of the drawings differs from that of Fig. 1 only in that an additional capacitor, $C_1$, here designated as an auxiliary capacitor, has been placed across the discharge electrodes 22 and 23. The use of the auxiliary capacitor $C_1$ makes it possible to crack nuts with power from the capacitors $C_2$ and $C_3$, charged to a considerably lower voltage than would be the minimum necessary if capacitor $C_1$ were not present. Circuit phenomena causes the maximum instantaneous voltage appearing across the electrodes to exceed the voltage at which capacitor $C_2$ was charged.

The circuit operation can be understood by considering the circuit loop consisting of discharge capacitor $C_2$, the interrupter switch $S'$, distributor switch $S''$, resistance and inductance which are inherent to this circuit loop but are not shown but will be understood by the engineer, and electrodes 22 and 23, shunted by the auxiliary capacitor $C_1$.

Consider the phenomena occurring at the instant the fully charged discharge capacitor $C_2$ is connected suddenly to the discharge circuit because the air gaps of the two switches $S'$ and $S''$ broke down. The voltage across capacitor $C_1$, hence between electrodes 22 and 23, will tend to rise to nearly twice the voltage to which capacitor $C_2$ was charged if the circuit constants are properly selected. When the voltage has risen to a sufficiently high value, breakdown through the nut occurs, precipitating the flow of the very large surge discharge current caused by the discharging of capacitor $C_2$. Shunting capacitor $C_1$ is of very small capacitance relative to discharge capacitor $C_2$.

Figure 5:
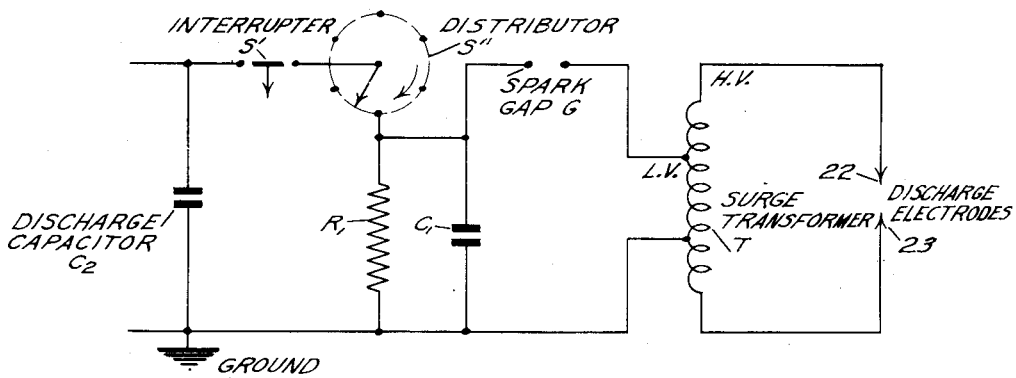
Fig. 5 is a different discharge end, substituted as before at the line 1—1 of Fig. 1, to be further explained, infra.

Fig. 5 shows a second modification of the basic circuit of Fig. 1 and discloses another means of causing the surge voltage appearing between the discharge electrodes 22 and 23 to be considerably greater than the voltage to which the discharge capacitor $C_2$ is charged. Furthermore, the rate of rise of voltage when the surge voltage is applied across the nut is increased to a very high rate. This factor may prove important in the electric cracking of nuts.

This circuit differs from that of Fig. 1 only in the final discharge circuit loop. An air-core surge auto-transformer T, a spark gap G, a capacitor $C'$ and resistor $R_1$ have been inserted between the switch $S''$ and the discharge electrodes.

This new section of the circuit operates in the following manner. Consider the instant of time at which the fully charged discharge capacitor $C_2$ has just been connected to the discharge circuit by virtue of the air gaps of interrupter switch $S'$ and of distributor switch $S''$ having broken down. Current flows from capacitor $C_2$ to charge capacitor $C'$ to a voltage sufficient to cause breakdown of gap G. Gap G is preferably set so that its breakdown voltage is close to the voltage to which discharge capacitor $C_2$ is charged. Capacitor $C_2$ is of much larger capacitance than capacitor $C'$. Capacitor $C'$ and gap G are located very close to transformer T both physically and electrically.

When gap G breaks down essentially the entire voltage of capacitor $C'$ is immediately impressed across the low voltage turns of the transformer. A replica of the primary, or low, voltage, multiplied by the effective turns ratio of the transformer, appears simultaneously across the high-voltage turns.

If no load were placed across the high-voltage turns of the transformer the voltage across this winding would rise from zero to maximum in a time very short compared to a millionth of a second, i. e. in a time identically the same as required to apply voltage across the low-voltage turns.

With the slight capacitive loading placed on the high-voltage turns by the presence of the walnut, insulator capacitance, etc., the situation is altered slightly, but yet the rate of rise of voltage across the nut is extremely fast. It is well known to those experienced in high-voltage surge work that very steep surge voltages have different breakdown and flashover characteristics than voltages of less steep wave front.

It is readily understood that the voltage across the high-voltage turns of the auto-transformer T can be made considerably greater than the voltage across the low-voltage turns. Therefore, the voltage at which the components of the power supply up to transformer T must operate can be considerably less than if this transformer were not incorporated.

Having disclosed my invention of a much higher speed repetitive surge circuit than has heretofore appeared in the electrical engineering art, I claim:

1. An electric high voltage surge circuit for nut cracking or the like, comprising a high voltage supply means followed in series by a reactor, a storage capacitor connected between the cathode and anode of the circuit, a resistor, an iron core reactor, a discharge capacitor connected between the cathode and anode of said circuit, a high velocity interrupter to distinguish between surges, a distributor and opposed electrodes between which a nut to be cracked is positioned.

2. In a high voltage circuit having non-oscillatory characteristics, a high voltage direct current supply means, a reactor, a grounded charging capacitor connected to the cathode side of said circuit, a high capacity resistor, an iron core reactor, a grounded discharge capacitor connecter to said anode side of said circuit next followed by a high velocity interrupter having a minimum speed of four thousand feet per minute to provide air gap current interruption between discharges, followed in the cathode line by a cathode discharge electrode in spaced opposition to a grounded anode electrode.

3. A high voltage surge discharge circuit, comprising a high voltage direct current supply means, a discharge circuit loop comprising cathode and anode circuit elements with opposed current utilization electrodes, the cathode leg of said loop having a protection reactor next said supply means a storage, charging capacitor across the line, next to said first named reactor, an adjacent discharge capacitor across said line parallel to said charging capacitor a high inductance reactor and a resistance between said capacitors in said anode line and a high velocity interrupting electrode positioned in said anode line to break said circuit after each discharge of said discharge capacitor by establishing an air gap in the circuit by the time said discharge capacitor is essentially discharged.

4. In a high voltage circuit of the character described, a high voltage direct current supply means, storage and discharge capacitors in spaced electrical communication therewith, a reactor positioned between said supply means and said storage capacitor a resistor followed next by an iron cored reactor between said supply means and said discharge capacitor, discharge electrodes for utilizing surges produced by said circuit a high speed timing interrupter positioned to control discharges from said discharge capacitor and a plural point distributor effective in cooperation with said interrupter to divert surges of electric current to different working locations.

MELVIN J. KOFOID.

REFERENCES CITED

The following references are of record in the file of this patent:

UNITED STATES PATENTS

| Number | Name | Date |
|---|---|---|
| Re. 22,572 | Miller | Nov. 28, 1944 |
| 472,193 | Marshall | Apr. 5, 1892 |
| 1,366,160 | Kloneck | Jan. 18, 1921 |
| 2,003,466 | Randolph et al. | June 4, 1935 |
| 2,097,882 | Hudtwalker | Nov. 2, 1937 |
| 2,165,065 | Marbury | July 4, 1939 |
| 2,357,652 | Haynes | Sept. 5, 1944 |
| 2,417,452 | Stiefel | Mar. 18, 1947 |
| 2,459,858 | Westcott | Jan. 25, 1949 |